(12) United States Patent
Marciante et al.

(10) Patent No.: US 7,949,017 B2
(45) Date of Patent: May 24, 2011

(54) METHOD AND APPARATUS FOR GENERATING HIGH POWER VISIBLE AND NEAR-VISIBLE LASER LIGHT

(75) Inventors: John R. Marciante, Webster, NY (US); Andrew T. Ryan, Atherton, CA (US)

(73) Assignee: Redwood Photonics, San Jose, CA (US)

( * ) Notice: Subject to any disclaimer, the term of this patent is extended or adjusted under 35 U.S.C. 154(b) by 207 days.

(21) Appl. No.: 12/400,621

(22) Filed: Mar. 9, 2009

(65) Prior Publication Data

US 2009/0225793 A1    Sep. 10, 2009

Related U.S. Application Data

(60) Provisional application No. 61/035,315, filed on Mar. 10, 2008.

(51) Int. Cl.
    *H01S 3/30*        (2006.01)

(52) U.S. Cl. .............................................. 372/3; 372/6
(58) Field of Classification Search .................. 372/3, 6, 372/21, 22, 102, 50.11
See application file for complete search history.

*Primary Examiner* — Armando Rodriguez
(74) *Attorney, Agent, or Firm* — Kilpatrick Townsend & Stockton LLP

(57) ABSTRACT

A multimode-fiber Raman laser includes a pump source configured to provide optical radiation centered at a pump wavelength and characterized by a spectral bandwidth greater than 100 MHz and an oscillator resonant at an emission wavelength greater than the pump wavelength. The oscillator includes an input coupler optically aligned with the pump source and a multimode optical fiber optically coupled to the input coupler. The multimode optical fiber includes an input section having a fiber Bragg grating, an intracavity section of a predetermined length optically coupled to the input section, and an output section having a fiber Bragg grating. The oscillator also includes an output coupler optically coupled to the multimode optical fiber and configured to provide a laser output at the emission wavelength.

25 Claims, 11 Drawing Sheets

METHOD AND APPARATUS FOR GENERATING HIGH POWER VISIBLE AND NEAR-VISIBLE LASER LIGHT

CROSS-REFERENCES TO RELATED APPLICATIONS

This present application claims priority to U.S. Provisional Patent Application No. 61/035,315, filed on Mar. 10, 2008, the disclosure of which is hereby incorporated by reference in its entirety for all purposes.

BACKGROUND OF THE INVENTION

High-power light at visible and near visible wavelengths is highly desirable in many applications. In medical applications, specific wavelengths are utilized to affect specific tissues. In the display industry, large displays and projection systems utilize red, green, and blue colors to derive the full observable color spectrum. Yellow lasers (e.g., 589 nm) are particularly useful for guide-star applications in correcting atmospheric distortions in ground-based extra-terrestrial imaging.

Generating power levels above 1 watt at arbitrary wavelengths has proven to be challenging, especially with good beam quality ($M^2$~1). GaN-based diode lasers can access visible and near-visible wavelengths, but the available output power is generally limited to the sub-watt level. Various gas and liquid (i.e., dye) lasers have similar performance, but are also plagued with efficiency and reliability issues, as well as significant system complexity. Despite their high reliability, solid-state and fiber lasers cannot readily access such wavelengths. One common technique used to obtain visible light is by frequency shifting via parametric processes, such as difference frequency generation, sum frequency generation, and second harmonic generation. While in certain very limited circumstances a specific visible wavelength (e.g. 532 nm from a frequency-doubled Nd:YAG laser) can be obtained with a single such process, typically several such processes are required in order to obtain an arbitrary yet specific wavelength. Not only are such systems highly complicated to construct and maintain, but the parametric processes are not highly efficient. Therefore, cascading parametric processes often results in lower output power or places high requirements on the original pump laser input power and beam quality.

Thus, there is a need in the art for improved optical sources emitting in the visible and near-visible region.

SUMMARY OF THE INVENTION

According to embodiments of the present invention, techniques related to the field of optical systems are provided. More particularly, the present invention relates to a system including a multimode fiber Raman laser that is configured to spatially clean up and simultaneously frequency convert, via the Stimulated Raman Scattering (SRS) process, the low-brightness emission of modern high-powered diode lasers into high-brightness light. The high brightness emission is appropriate for efficient nonlinear frequency conversion, via parametric processes, to produce visible wavelengths at high efficiency and high power compared to existing technologies. The apparatus can be applied to other applications as well.

In a specific embodiment, a laser source includes a pump source having an output at a first wavelength and a multimode-fiber Raman laser (MFRL) coupled to the pump source. The Raman laser converts the first wavelength to a predetermined second wavelength. The laser source may also include a frequency converter to convert the high-brightness emission of the MFRL to visible or near-visible wavelengths.

According to an embodiment of the present invention, a multimode-fiber Raman laser is provided. The laser includes an oscillator resonant at an emission wavelength greater than a pump wavelength. The oscillator includes a pump source configured to provide optical radiation centered at the pump wavelength and characterized by a spectral bandwidth greater than 100 MHz, thereby inducing negligible stimulated Brillouin scattering. The oscillator also includes an input coupler optically aligned with the pump source and a multimode optical fiber optically coupled to the input coupler. The multimode optical fiber includes an input section having a fiber Bragg grating characterized by a first predetermined reflectance at the emission wavelength and an intracavity section of a predetermined length optically coupled to the input section. The intracavity section is subjected to a SRS process thereby enabling power generation at arbitrary wavelengths. The multimode optical fiber also includes an output section having a fiber Bragg grating characterized by a second predetermined reflectance at the emission wavelength and optically coupled to the intracavity section. The oscillator additionally includes an output coupler optically coupled to the multimode optical fiber and configured to provide a Raman laser output at the emission wavelength.

According to another embodiment of the present invention, a laser includes an array of semiconductor diode lasers configured to provide pump radiation at a pump wavelength. The pump radiation is characterized by a spectral bandwidth greater than 1 GHz. The laser also includes a multimode optical fiber coupled to the array of semiconductor diode lasers. A core diameter of the multimode optical fiber is between 50 µm and 200 µm. The laser also includes an oscillator having an input section including a first fiber Bragg grating having a first reflectance at an emission wavelength, an intracavity section coupled to the input section, and an output section coupled to the intracavity section. The output section includes a second fiber Bragg grating having a second reflectance at the laser emission wavelength and a third fiber Bragg grating having a third reflectance at the pump wavelength. The laser may additionally include a second-harmonic generation element optically aligned to the output section and configured to produce a frequency-converted output characterized by a wavelength equal to half the emission wavelength.

Many benefits are achieved by way of the present invention over conventional techniques. For example, embodiments of the present invention provide efficient and reliable laser sources with high brightness output beams. These and other benefits will be described in more detail throughout the present specification and more particularly below in conjunction with the following drawings.

DETAILED DESCRIPTION OF SPECIFIC EMBODIMENTS

Figure 1:
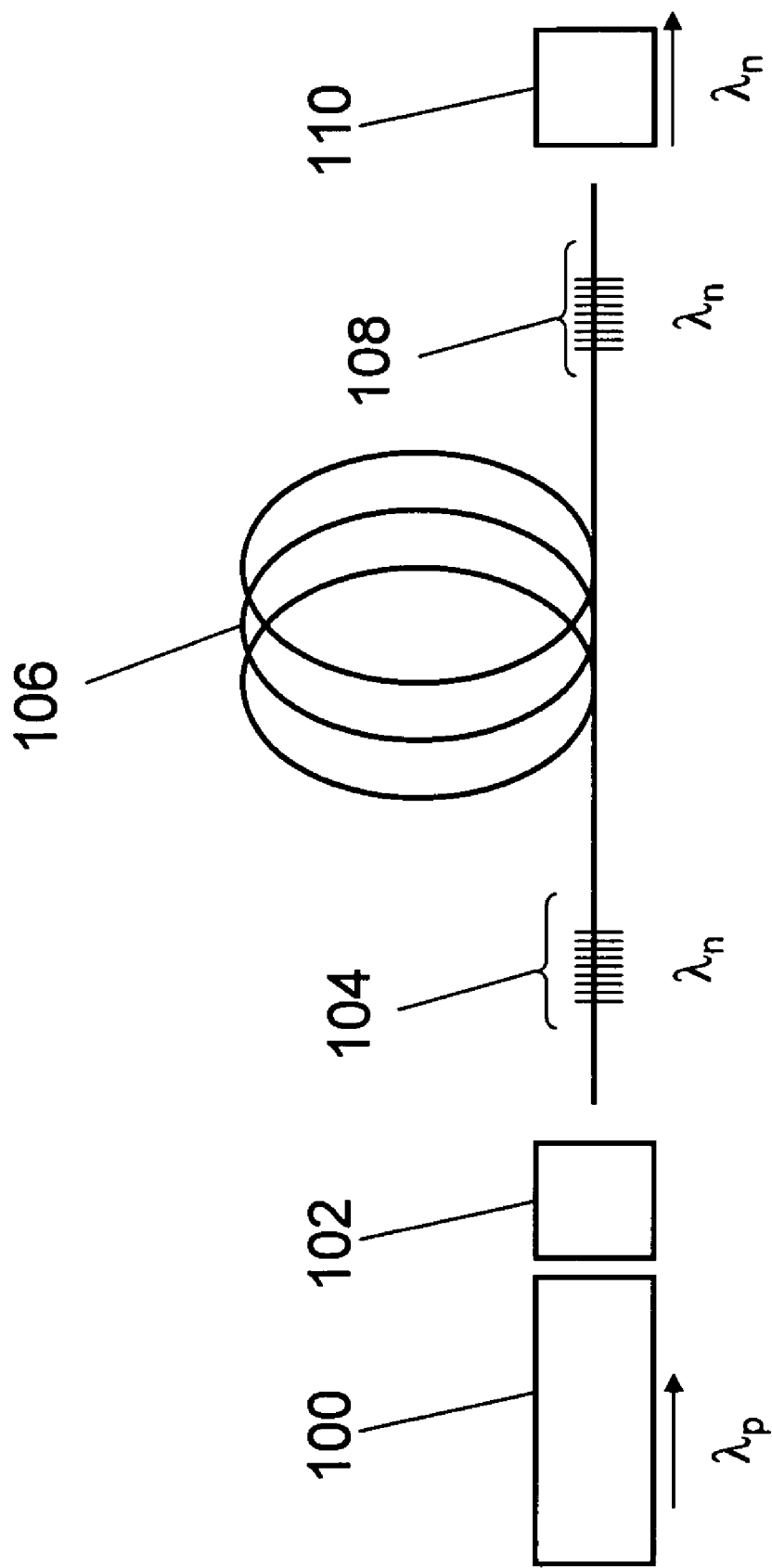
FIG. 1 is a simplified schematic diagram of a multimode-fiber Raman laser source according to an embodiment of the present invention.

The first fiber-based Raman lasers were demonstrated in the late 1970's. In 1992 Chiang used nanosecond pulses from a dye laser to observe beam cleanup via SRS in multimode optical fiber. In 1999 Rodgers et al demonstrated coherent beam combining and cleanup using stimulated Brillouin scattering in multimode optical fiber. This work was followed up two years later combining incoherent beams.

Significant advances in rare-earth-doped fiber lasers began at the turn of the millennium. These advances were driven by improvements in diode pump lasers, fiber processing and device design. Substantial effort and innovation have been invested in maintaining single-mode operation in these high-power devices. The bias towards single-mode devices has been maintained as high-power Raman lasers have begun being sought.

In 2002 Dianov published a review article, "Advances in Raman Fibers" and discussed only single-mode devices. In the above referenced articles, fiber Raman lasers are made from single-mode fibers. In 2004 Baek and Roh demonstrated a single-mode Raman laser based on multimode fiber. This device was pumped by an inherently narrow-linewidth Nd:YAG laser.

Also in 2004, Skubchenko et al demonstrated a "high-power" fiber Raman laser in a single mode fiber, pumped by a single mode Yb-doped fiber laser. As in previous conventional designs, the path to high-powered Raman laser was analogous to that chosen for high-powered rare-earth doped fibers: single-mode pump and single-mode oscillator.

In 2006 another group used cladding pumping, analogous to that used for high-power rare-earth-doped fiber lasers, to demonstrate a high-powered Raman laser, again in single-mode fiber. Later in 2006, another group explored the limitations on Raman laser spectra at high powers due to nonlinear four wave mixing (FWM). The limitations imposed on high-power fiber lasers by the stimulated Brillouin scattering phenomenon was discussed.

Following up on earlier work, Flusche et al demonstrated beam combination and clean up using SRS in 100-µm and 200-µm fiber in an amplifier configuration. They then extended this work by using a multimode-fiber Raman laser pumped by Nd:YAG for beam combination. Raghunathan et al used a single-mode pump to demonstrate a self-imaging silicon Raman amplifier, effectively teaching away from the use of a multimode pump.

In 2000, Dianov et al demonstrated a Raman laser in phosphorus-doped silica fiber. The phosphorus doping enables significantly larger Stokes shift than undoped silica fiber. The effectiveness of single-pass frequency-doubling of single spatial-mode light in periodically poled materials to achieve high-powers in the visible has been demonstrated recently. In 2005 Georgiev et al achieved over 3 W from frequency doubling of a narrow line linearly polarized Raman fiber laser to 589-nm. The system employed a single-spatial mode Yb-doped fiber laser as a pump source for a single-mode fiber Raman laser. Also in 2005, Liu et al used single-pass frequency doubling to generate 60 W of green light at approximately 50% conversion efficiency.

Per Agrawal, "Stimulated Raman scattering (SRS) is an important nonlinear process that can turn optical fibers into broadband Raman amplifiers and tunable Raman lasers." The fundamental physics of the Raman effect are described thus, "In any molecular medium, spontaneous Raman scattering can transfer a small fraction (typically $\sim 10^{-6}$) of power from one optical field to another field, whose frequency is downshifted by an amount determined by the vibrational modes of the medium. This process is called the Raman effect. It is described quantum-mechanically as a scattering of a photon by one of the molecules to a lower-frequency photon, while the molecule makes a transition to a higher-energy vibrational state. Incident light acts as a pump for generating the frequency-shifted radiation called the Stokes wave." In silica fibers, the molecular vibrational states scatter light in a spectrum of energies extending out to 42 THz, dominated by a double peak near 14 THz. The Stokes wavelength, $\lambda_R$, is calculated from Eqn. 1, $$\frac{1}{\lambda_R} = \frac{1}{\lambda_P} - \frac{\Delta v_R}{c} \qquad \text{Eqn. 1}$$

where $\lambda_R$ is the pump wavelength, $\lambda_P$ is the pump wavelength, c is the speed of light in vacuum, and $\Delta v_R$ is the Raman frequency shift. In phosphate doped fibers, the Stokes spectrum is centered at 39.9 THz, allowing for significantly larger Raman frequency shifts. By virtue of the central limit theorem, the signal wave generated by the MFRL tends to have excellent beam quality, regardless of the fiber core diameter or the beam quality of the pump source. Additionally, embodiments of the present invention avoid spectral broadening that is often seen in Raman lasers when the output powers reach beyond a watt. Four-wave mixing (FWM) is an intensity-dependent nonlinear process known to result in spectral broadening in fiber Raman lasers. By employing a multimode fiber, the effective area of the fundamental mode is substantially increased over that in a single-mode fiber. This increase in effective area results in a substantial decrease in intensity for a given power level. This reduced intensity due to the larger effective area enables the MFRL to operate at significantly higher power levels than a comparable standard single-mode fiber Raman laser while maintaining the same spectral quality for a given operating power level. Two other important nonlinear phenomena, self-phase-modulation (SPM) and cross-phase-modulation (XPM), are also diminished in significance as the core size is increased and peak intensity is reduced. Therefore, by utilizing a multimode core in the invention, spectral broadening is avoided even as the power is scaled well beyond the watt level.

The performance of the fiber as a Raman gain medium is determined by several parameters: length, loss and diameter. The interaction of the pump and Stokes wave is governed by a set of coupled equations for counter-propagating optical power:

$$\pm \frac{dP_s^\pm}{dz} = \frac{\delta g_R}{A_{eff}}(P_p^\pm + \sigma P_p^\mp)P_s^\pm - \alpha_s P_s^\pm \qquad \text{Eqn. 2}$$

$$\pm \frac{dP_p^\pm}{dz} = -\frac{\lambda_s}{\lambda_p}\frac{\delta g_R}{A_{eff}}(P_s^\pm + \sigma P_s^\mp)P_p^\pm - \alpha_p P_p^\pm \qquad \text{Eqn. 3}$$

where $g_R$ is the Raman gain coefficient, $P_s$ and $P_p$ are the powers of the pump and Stokes waves, $A_{eff}$ is the effective area of the fiber mode, $\sigma$ accounts for the lower efficiency of counter-propagating SRS, $\delta$ is a depolarization factor to account for random polarizations (for linearly polarized pump and Stokes, $\delta=2$), and $\alpha_s$ and $\alpha_p$ are the fiber losses at the Stokes and pump wavelengths respectively. The boundary conditions that describe the diode-pumped MFRL are:

$$P_s^+(0) = R_1 P_s^-(0) \qquad \text{Eqn. 4a}$$

$$P_p^+(0) = P_{pump} \qquad \text{Eqn. 4b}$$

$$P_s^-(L) = R_2 P_s^+(L) \qquad \text{Eqn. 4c}$$

$$P_p^-(L) = R_p P_p^+(L) \qquad \text{Eqn. 4d}$$

where $R_1$ is the reflectance of the input section at the Stokes wavelength, $R_2$ is the reflectance of the output section at the Stokes wavelength, and $R_p$ is the reflectance of the output section at the pump wavelength. To estimate threshold and slope efficiencies for given core diameter and length parameters, these equations can be solved iteratively with a finite-difference scheme until the solution converges.

The reflectivity of the FBG is determined by the modulation of the index of refraction and the length of the grating. Current techniques enable the fabrication of gratings that can deliver substantially total reflection (>99%) at a specified wavelength, known as the Bragg wavelength, $\lambda_B$, with a precision of better than 0.3 nm. By design, the FBG in the input section will have its peak reflectivity near the peak of the Raman gain with respect to the pump wavelength in the fundamental mode of the fiber. The Bragg wavelength of the FBG can be calculated from the formula:

$$\lambda_B = 2 n_{eff} \Lambda \qquad \text{Eqn. 5}$$

where $n_{eff}$ is the effective index of refraction of the fiber mode and $\Lambda$ is the period of the index modulation. In a multimode fiber, each mode has a different effective index and so experiences a different $\lambda_B$. For sufficiently large differences in mode index the reflectivity of the higher-order modes can experience a $\lambda_B$ significantly different from that experienced by the fundamental mode thus providing a mode selection mechanism. In particular, each mode will experience a different $\lambda_B$ depending on its mode index, thus at a given wavelength, some higher order modes may be outside the reflection band of the grating. To take a particular example, a 50-μm core fiber was shown to have over 100 modes at a wavelength of 1.55 μm. The reflections from the grating spanned over 16 nm with a full width at half maximum of 10 nm. Were that grating illuminated by light with a bandwidth of 1 nm centered near the long wavelength edge of the multimode response, only the fundamental and low-order modes would be reflected by the grating. The exact number of low order modes reflected depends on the bandwidth of the grating and the dispersion of the modes.

The bandwidth of a fiber Bragg grating, $\Delta\lambda$, for a given fiber mode can be predetermined by design and is typically 0.1-5 nm wide depending on $\lambda_B$, the grating length, and the depth of index modulation. The exact relationship between the bandwidth and these parameters is reviewed by Erdogan and derived in great detail by Kashyap for the general case. Following Kashyap, we define the bandwidth for a given fiber mode as the separation between the first minima on either side of the main reflection peak for that mode. Under that definition, the bandwidth for the grating can be shown to be given by, $$\Delta\lambda = \frac{\lambda^2}{\pi n_{eff} L}\sqrt{(\kappa L)^2 + \pi^2} \qquad \text{Eqn. 6}$$

where $\kappa$ is a coupling coefficient related to the depth of the index modulation of the grating. By inspecting Eqn. 6, we can see that for weak gratings ($\kappa L \ll \pi$) the grating bandwidth is an inverse function of length, i.e. the bandwidth gets narrower as the grating gets longer. Further, we can see that for strong gratings, ($\kappa L \gg \pi$) the bandwidth becomes independent of length and is proportional to $\kappa$ and the depth of index modulation. In practice, the physical limits of photosensitivity leave grating design substantially in the weak coupling limit ($\kappa L < \pi$) whereby bandwidth is determined primarily from the length of the grating. As an example, the 10-mm grating used by Baek and Roh achieved greater than 98% reflectivity with a less than 2 nm bandwidth centered near 1116 nm. In contrast with earlier work in the area, however, the authors inferred "very little, if any, mode selection by the grating."

A challenge faced when one attempts to predict and measure the performance of a grating in a multimode fiber is to measure the power distribution among the hundreds or even thousands of modes in a multimode fiber, therefore precise measurement of reflectance or transmittance of a given fiber mode at a given wavelength is challenging. What is less challenging is the design and measurement of the fundamental mode performance. For the fundamental mode $\lambda_B$ can be approximately predicted from Eqn.5 by noting that for the fundamental mode, $n_{eff} \approx n_{core}$, which will be the largest mode index of all the modes in the fiber. Therefore, $\lambda_B$ for the fundamental mode will be at the longest wavelength for which the grating shows a reflection peak. By performing a careful transmission measurement of the grating using a single mode laser aligned for optimum fundamental mode coupling we can achieve an approximate measurement of the reflective/transmissive properties of the grating at the $\lambda_B$ for the fundamental mode. This is a parameter of interest in determining laser operation.

FIG. 1 is a simplified schematic diagram of a multimode-fiber Raman laser (MFRL) source according to an embodiment of the present invention. As illustrated in FIG. 1, the laser architecture described herein can provide powers beyond the watt level at visible and near-visible wavelengths. There are five illustrated components of the MFRL: the pump source 100, the input coupler 102, the input section 104, the length of multimode optical fiber 106 disposed between the input section, the output section 108, and the output coupler 110.

In FIG. 1 the pump source 100 has a center wavelength $\lambda_p$ and sufficient spectral bandwidth to substantially suppress the onset of stimulated Brillouin scattering (SBS) in the multimode optical fiber. Agrawal discusses the effects of SBS thus, "SBS is a nonlinear process that can occur in optical fibers at input power levels much lower than those needed for stimulated Raman scattering (SRS). The former manifests through the generation of a backward propagating Stokes wave that carries most of the input energy, once the Brillouin threshold is reached." In single mode fibers the SBS threshold has been shown to be as low as a few mW. The SBS process in silica fibers has a bandwidth of approximately 100 MHz. A pump source with a spectral bandwidth comparable to or greater than this will not experience significant SBS, regardless of power level.

In one embodiment, the pump source is made from simple, reliable, and relatively inexpensive (compared to gas, dye, or solid-state lasers) diode lasers. Because they are typically made from arrays of broad-area devices, such a source usually has very poor beam quality and therefore relatively low brightness (power per unit area and angle of emission). Also, the large gain bandwidth of the semiconductor material leads to relatively broadband emission from all but the most specialized diode lasers. However, diode lasers in general do have very high efficiency. Moreover the combination of low voltage and excellent electrical-to-optical conversion efficiency enables diode lasers to be the leading technology for system-level wall-plug efficiency. In addition, significant optical power can be obtained, from watts to kilowatts, at many different wavelengths defined by applications already in the marketplace: 808-nm pumps for Nd:YAG lasers, 915-nm pumps for rare-earth-doped fiber lasers, and the like. Further, because the wafer-processing required to manufacture diode lasers has matured in parallel with the microprocessor and telecommunications industries, diode lasers are exceptionally reliable, with reported lifetimes of several tens of thousands of hours even for high-powered devices.

Figure 3A:
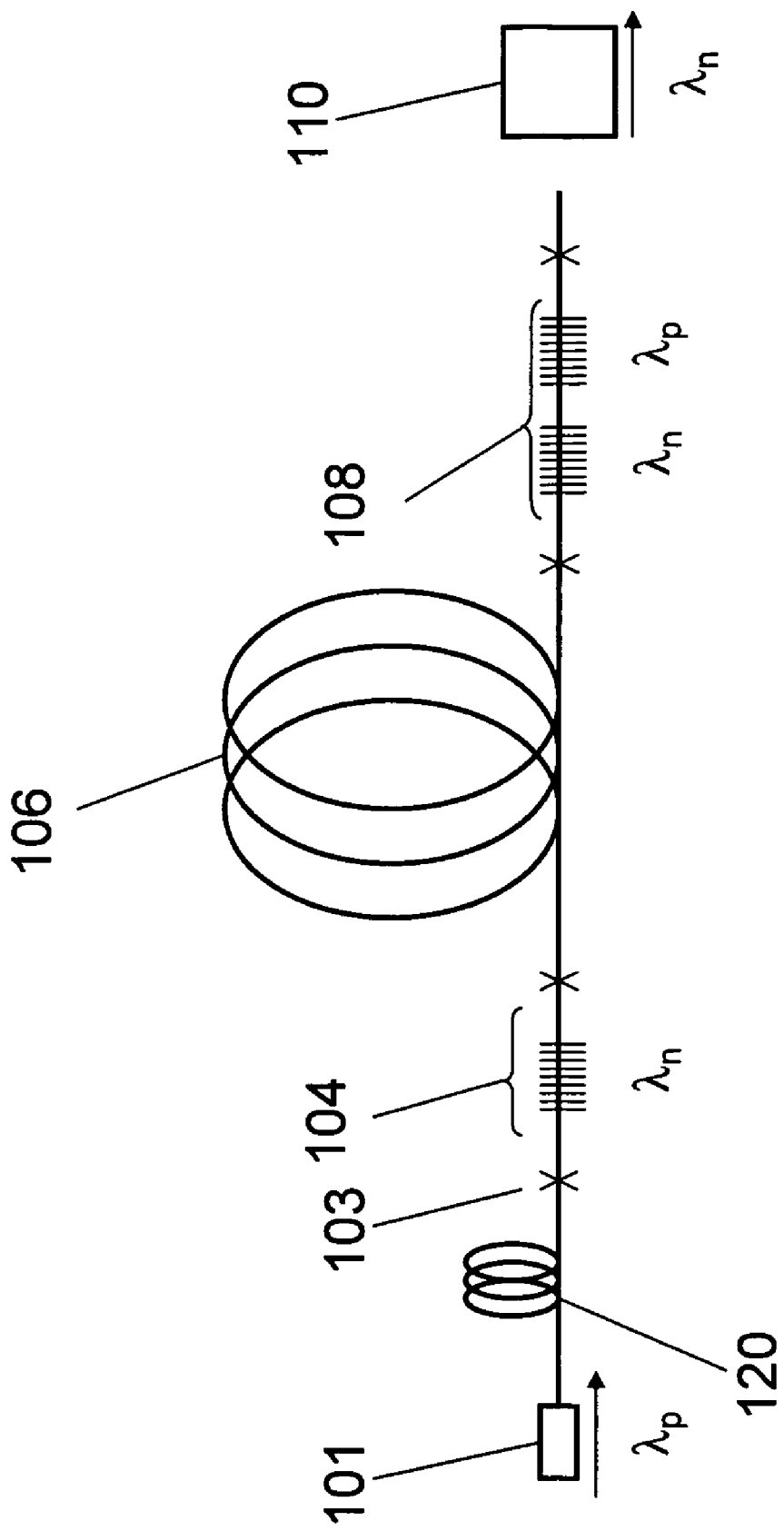
FIG. 3A is a simplified schematic diagram of a multimode-fiber Raman laser source incorporating a fiber-coupled diode laser as the pump source.

In one embodiment of this invention, the diode laser source is one or a plurality of single emitters. In another embodiment, the diode laser source is a bar of emitters. In another embodiment, the diode laser source is a stack of emitter bars. In a particular embodiment, the emitters are high-powered, low-brightness, multiple-longitudinal-mode broad-area devices. In one embodiment shown in FIG. 3A the diode laser source 101 is coupled into a multimode delivery fiber 120. In another embodiment of the invention, the diode laser is pulsed.

Figure 3B:
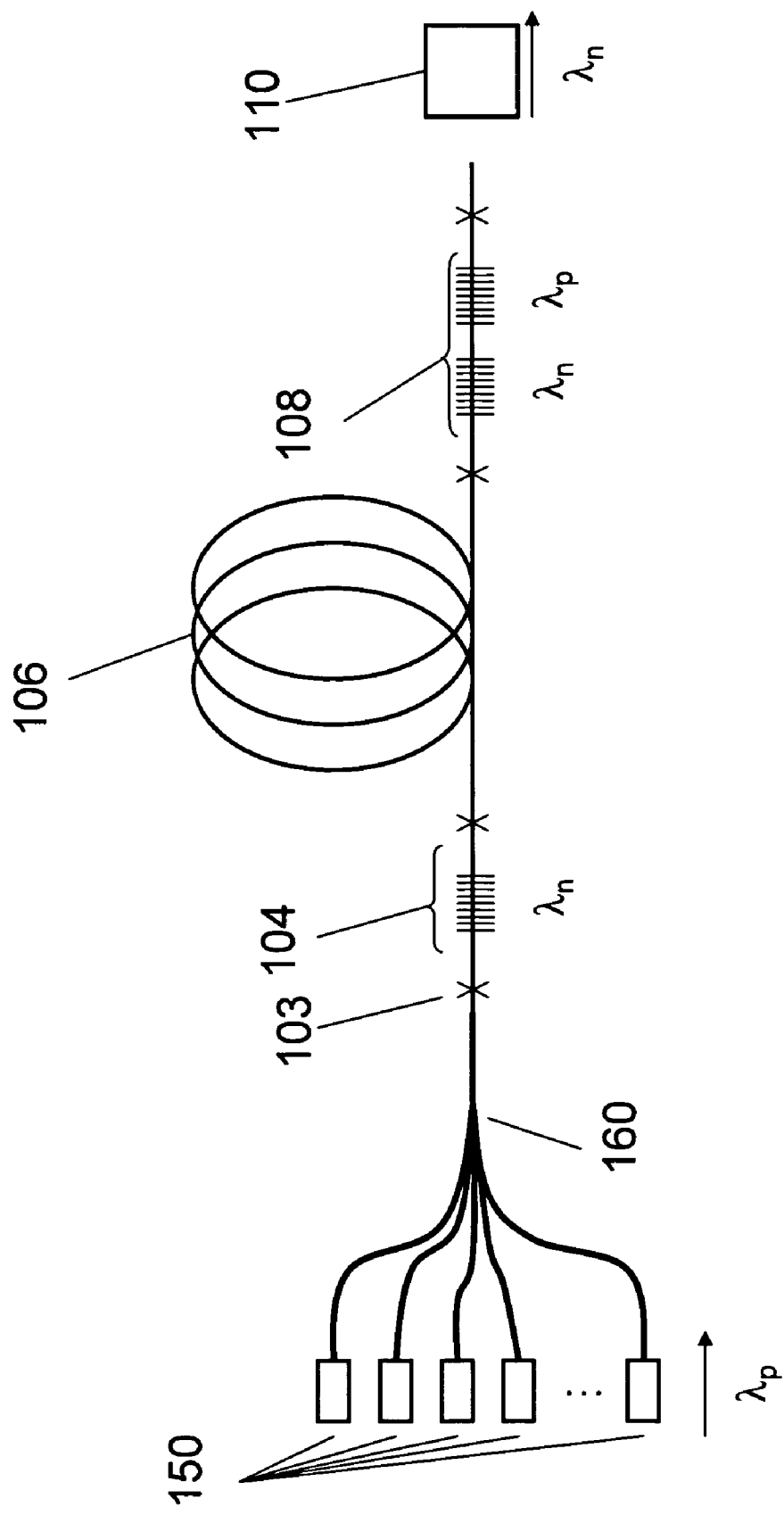
FIG. 3B is a simplified schematic diagram of a multimode-fiber Raman laser source incorporating a plurality of fiber-coupled laser diodes as the pump source according to another embodiment of the present invention.

The input coupler 102 provides high overall system efficiency. The input coupler is the element of the system whereby light from the diode laser is introduced into the input section of the length of multimode fiber. In one embodiment, the input coupler is a very small gap between the diode laser end facet and the input section. In another embodiment, the input coupler is a simple lens or lens system that collects the light from the pump source and focuses it into the multimode fiber at a numerical aperture comparable to or less than the acceptance angle of the fiber. The poor spatial behavior typical of high-powered laser-diode devices has engendered the development of several new schemes for coupling diode light into optical fibers. In particular, lensed fiber tips, flys-eye arrays, and even holographic phase masks have all been demonstrated or employed in products coupling light into fibers. For diode arrays and multiple diode-pumped schemes, techniques such as fused-fiber couplers and squid couplers have enabled the coupling of light from many emitters into the inner cladding of dual-clad fibers. These dual-clad techniques can be employed here because like the inner cladding of dual clad fibers, the core of a multimode fiber is substantially larger than the core of a single mode fiber and so facilitates multiple fiber coupling schemes. In one embodiment wherein the pump source is a plurality of single emitters, the single emitters are individually coupled to multimode fibers, the multimode fibers further comprising the input fibers of a fused fiber bundle, the single output fiber of the fused fiber bundle optically aligned with input coupler. In some embodiments, shown in FIGS. 3A and 3B the input coupler is a fusion splice 103 connecting the multimode delivery fiber from a diode laser to the input section 104 of the MFRL. It will be appreciated that other coupling techniques in addition to or in place of a fusion splice may be used and are included within the scope of the present invention.

The input section 104 in FIG. 1 is a fiber Bragg grating (FBG) contained in a length of multimode optical fiber. The FBG is fabricated by methods known to one of skill in the art. By design, the input section FBG will have high transmission at $\lambda_p$ and very high reflection at the desired emission wavelength, $\lambda_n$. Theoretically, the highest efficiency operation will be achieved when $\lambda_n = \lambda_p + \Delta\lambda_{Rpeak} = \lambda_B$, where $\Delta\lambda_{Rpeak}$ corresponds to the wavelength for which the Raman gain is highest. In silica fibers, there are two gain peaks, one at 13.2 THz (440 cm$^{-1}$) and the other at 14.7 THz (490 cm$^{-1}$). In practice, the longer-wavelength peak at 14.7 THz exhibits more efficient laser performance because of additional SRS from emission at the 13.2 THz peak. In one embodiment of the present invention, when pumping with $\lambda_p = 808$ nm, the most efficient laser operation occurs for $\lambda_n = 840$ nm. There is a broader Raman gain peak at 13.2 THz which can also be used when control of the $\lambda_p$ is difficult, as is common with diode lasers. Thus for another embodiment for pumping at 808 nm, the input section grating is designed for high reflectivity at the peak at 836.8 nm. In another embodiment for pumping at 808 nm the input grating section measured peak reflectance differs by less than 0.3 nm from the design peak at 836.8 nm due to the limitations of fabrication precision known by one skilled in the art. In phosphate-doped fibers, the Raman gain peak occurs at approximately 1330 cm$^{-1}$ (39.9 THz). In one embodiment of the present invention, a phosphate-doped fiber is used. When pumping a phosphate-doped fiber with $\lambda_p = 980$ nm the most efficient laser operation will occur at a wavelength near 1108 nm. In another embodiment, the multimode fiber is polarization maintaining (PM), the pump light is substantially linearly polarized, and the polarization of the pump light is substantially aligned with the preferred polarization direction of the multimode fiber fundamental mode. In this embodiment, the laser light generated will be substantially linear polarized, the output polarization aligned with the pump light and the efficiency of the laser increased by as much as a factor of 2 by the alignment of polarizations when compared to a system constructed with non-PM fiber.

The output section 108 is positioned as shown in FIG. 1 at the further end of the length of multimode fiber. The function of the output section is to allow a portion of the Stokes light to escape the oscillator. This is achieved by a partially transmissive FBG at $\lambda_n$. The transmittance of the output section in the fundamental mode at $\lambda_n$ is measured in a manner analogous to that for the input section. The design of the transmission percentage of the output section depends on the length of multimode fiber 106, the fiber loss, the coupled pump intensity and the desired operating point of the system. The lower the transmission of the output section at $\lambda_n$, the higher the threshold and the steeper the slope of the system response.

The longer the fiber, the greater the nonlinear gain for a given pump power and the greater the loss for any pump power. In one embodiment of the present invention, a 200 meter 105 μm core multimode fiber with 3.4 dB/km loss and 100 W of coupled pump power at 808 nm, an output coupler transmittance of 9% will provide 8 W of output power at 836.8 nm and a threshold of approximately 75 W. In another embodiment, a 200 meter 62.5 μm core multimode fiber with 1.4 dB/km loss and 40 W of coupled pump power at 976 nm, an output coupler transmittance of 15% will provide over 13 W at 1018 nm and a threshold of approximately 25 W.

Figure 2:
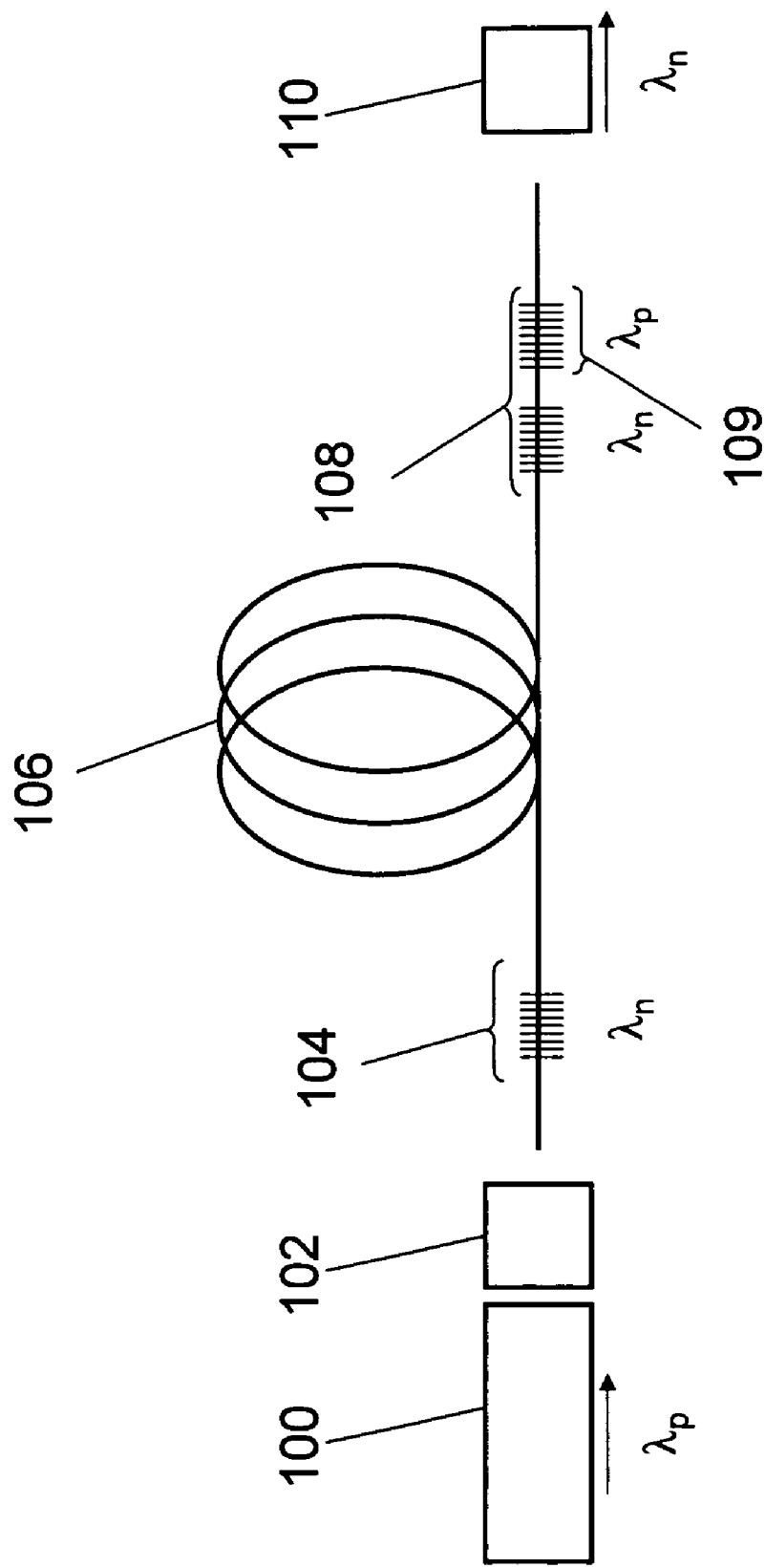
FIG. 2 is a simplified schematic diagram of a multimode-fiber Raman laser according to an embodiment of the present invention further including a pump reflector.

In another embodiment, shown in FIG. 2, the output section 108 contains a second FBG 109. The second FBG is designed to reflect pump light that has not been converted to Raman light in the oscillator. For optimum system performance, this grating is designed for very high reflectance (>99%) at $\lambda_p$, although, lower reflectance will still provide an improvement in overall system performance relative to the case when no such pump light reflector is used. For some diode lasers, current and temperature tuning lead to a variable $\lambda_p$. Also, as discussed earlier, the multimode nature of the fiber and the grating response mean that for a given grating the different fiber modes will experience different $\lambda_B$, thus in one embodiment of the invention, the second FBG in the output section has a wide bandwidth to allow for both the multimode response and the broad bandwidth of the pump laser. In a particular embodiment of the present invention, the bandwidth of the second FBG in the output section is approximately 10-nm. A 10-nm grating can be achieved by means common in the art for producing chirped gratings. The length of multimode fiber 106 provides the gain medium for the MFRL.

Figure 4:
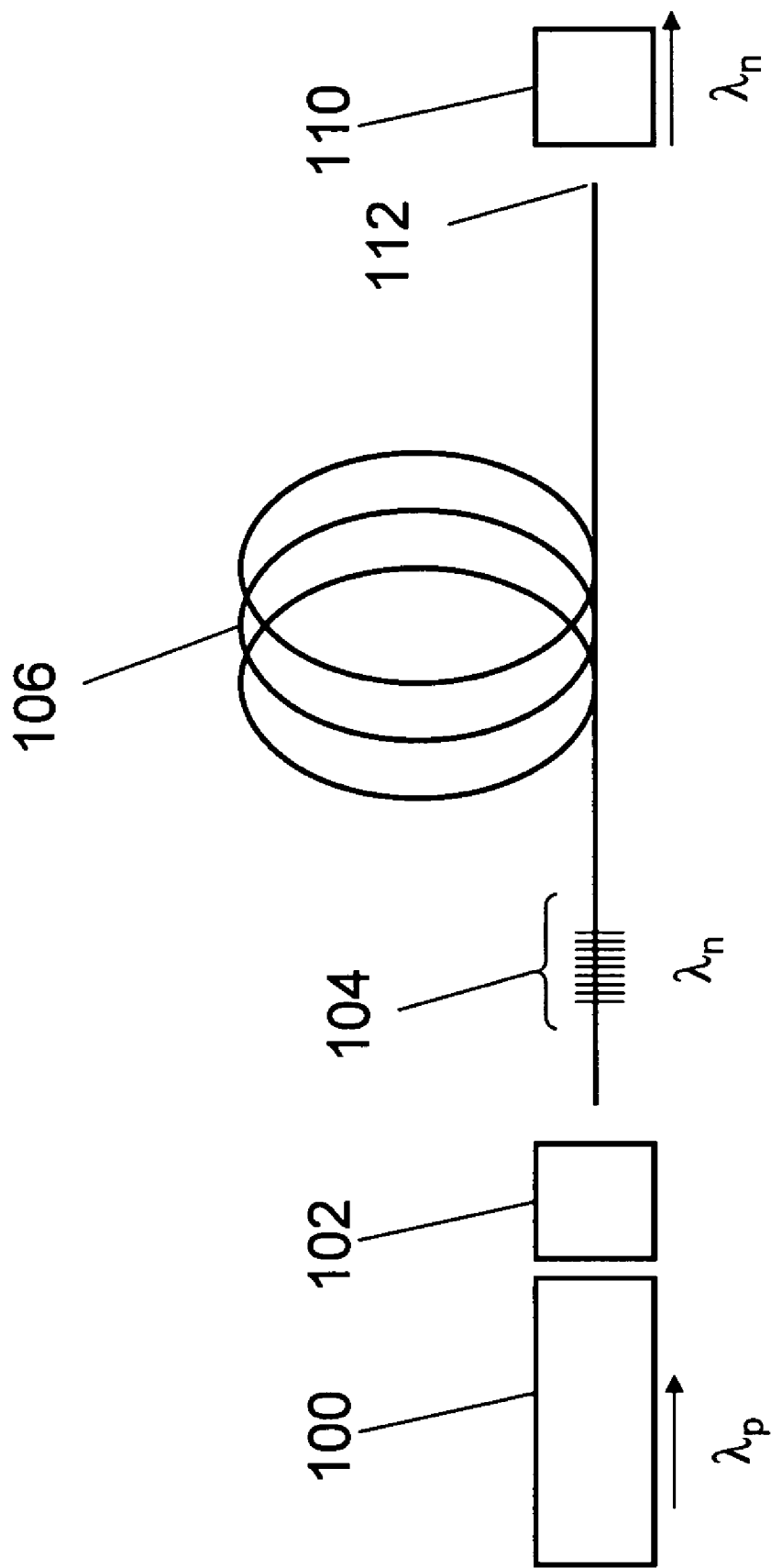
FIG. 4 is a simplified schematic diagram of a multimode-fiber Raman laser source where the output reflector is the fiber end facet according to an embodiment of the present invention.
Figure 5:
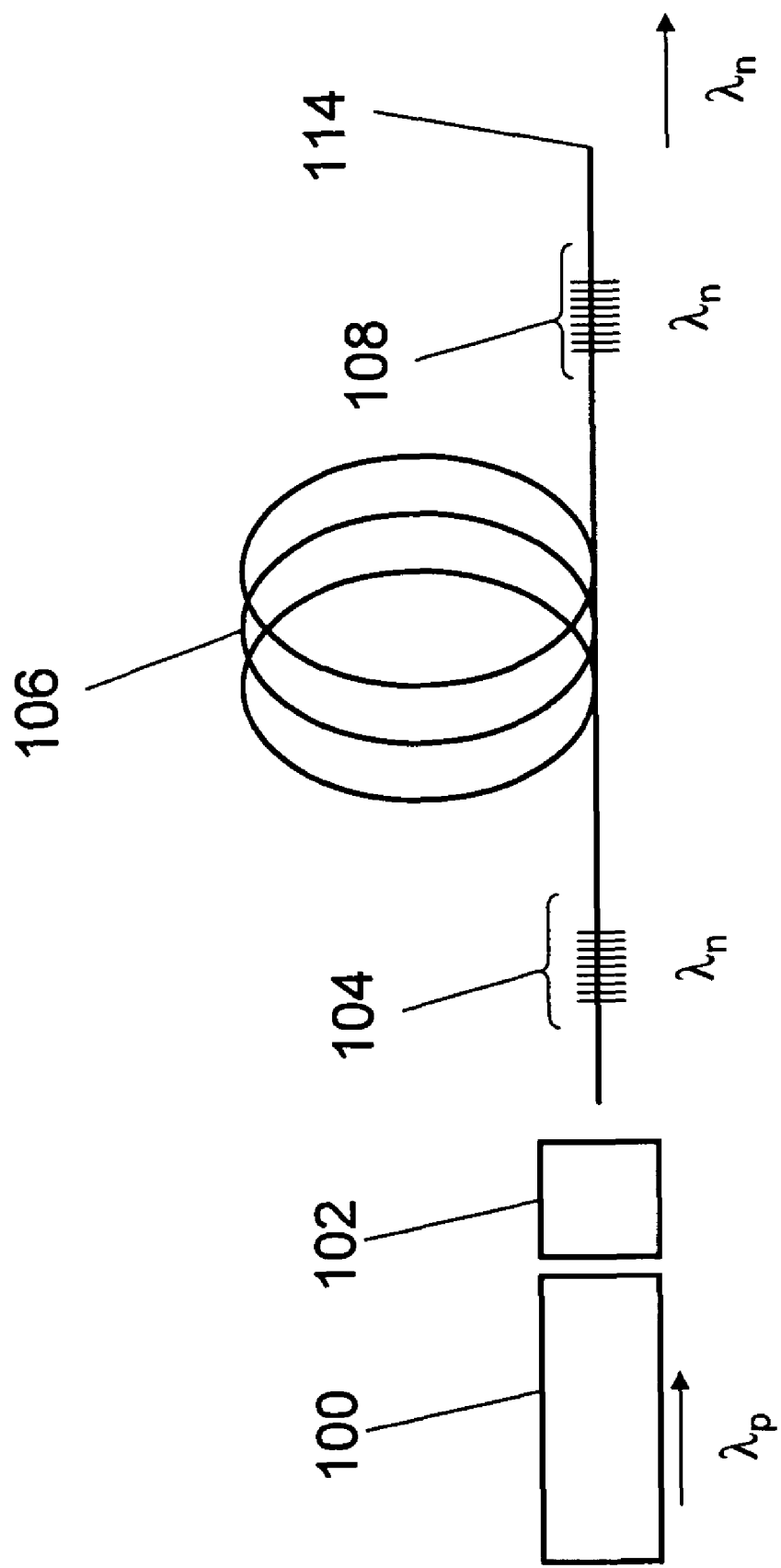
FIG. 5 is a simplified schematic diagram of a multimode-fiber Raman laser source where the fiber tip has been optically processed according to an embodiment of the present invention.

The output coupler 110 enables the laser output from the MFRL to be collected and directed outside the system. In one embodiment shown in FIG. 4 the output coupler is a cleaved fiber end facet 112. In another embodiment shown in FIG. 5 the output coupler is a processed fiber tip 114 designed to act as a lens by adding a phase curvature to the emitted light.

Figure 6:
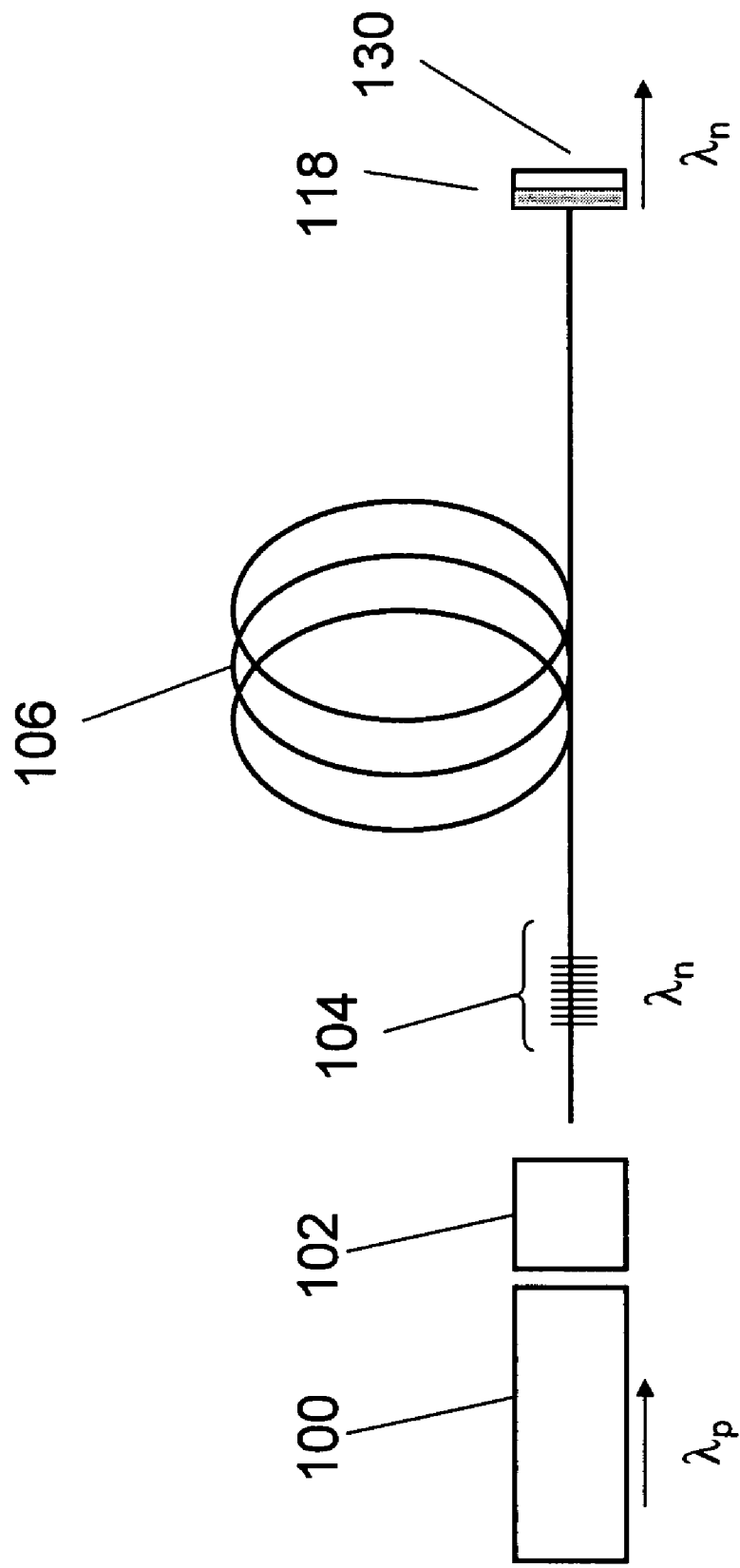
FIG. 6 is a simplified schematic diagram of a multimode-fiber Raman laser source where the output section fiber Bragg grating has been replaced by a partially transmissive mirror and the output coupler is the polished backside of the mirror.

In another embodiment, shown in FIG. 6, the output section comprises a mirror 118 coated to be partially transmissive at the emission wavelength. In this embodiment the output coupler 130 is the optically polished backside of the mirror. In another embodiment, the backside of the mirror is curved. In another embodiment the mirror is reflective at the pump wavelength.

Figure 7:
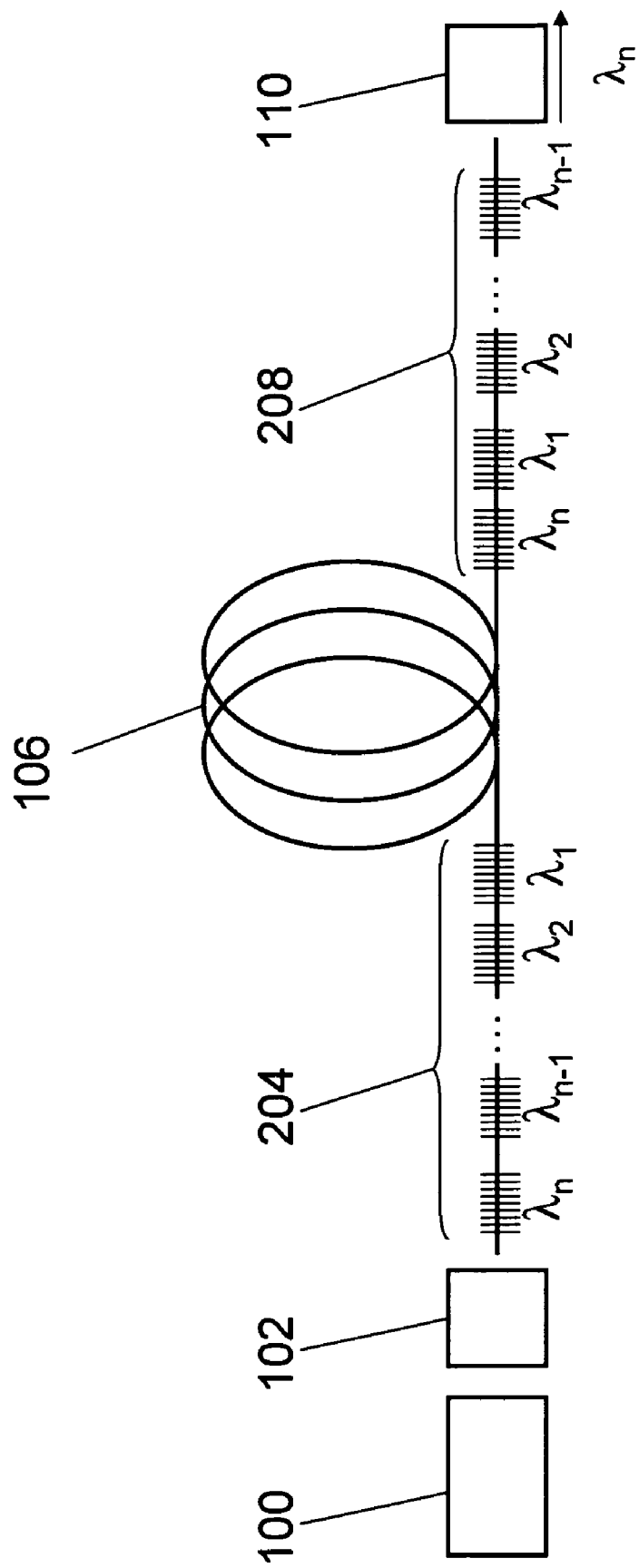
FIG. 7 is a simplified schematic diagram of a multimode-fiber Raman laser source further including additional reflectors in the input and output sections according to an embodiment of the present invention.

In another embodiment, shown in FIG. 7, the MFRL consists of cascaded Raman cavities in order to shift the wavelength several times. Such a shift comes from serial application of Eqn. 1, where the value of $\Delta v_R$ can be different on each successive Raman cavity depending on the spectral selectivity of the reflectors and provided each shift remains within the Raman gain spectrum. In this embodiment, the input section 204 contains highly-reflective components at each of the Raman wavelengths, and the output section 208 contains highly-reflective components at each of the Raman wavelengths except for the final shift, for which the reflectance is selected to optimize lasing threshold and output power.

Figure 8:
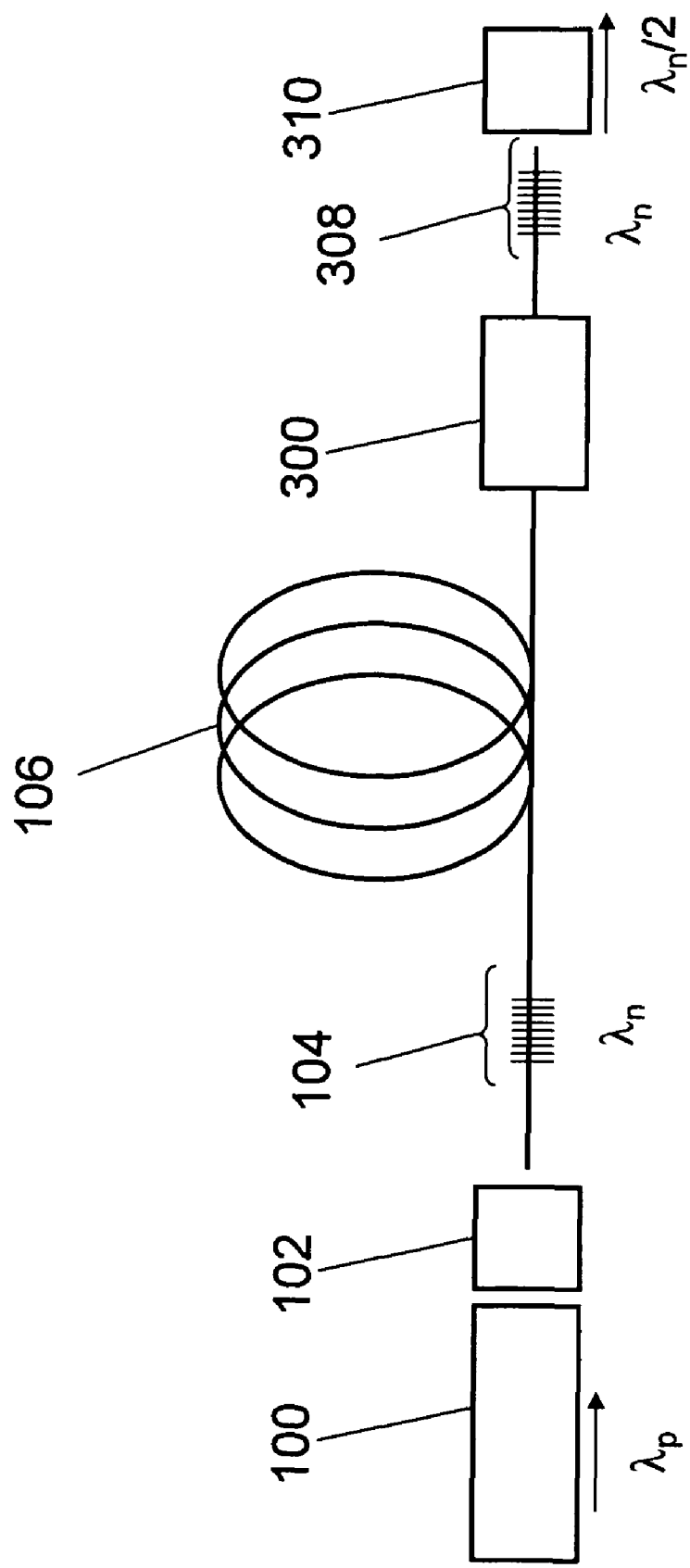
FIG. 8 is a simplified schematic diagram of a multimode-fiber Raman laser source further including a second harmonic generator disposed between the input section and the output section according to an embodiment of the present invention.

FIG. 8 is a simplified schematic diagram of a MRFL further including an intracavity second harmonic generation (SHG) element 300 according to an embodiment of the present invention. As illustrated in FIG. 8, the laser architecture described herein can provide powers beyond the watt level at visible and near visible wavelengths. The single-spatial mode nature of the light generated in the MFRL makes it well-suited to efficient SHG by methods known to one skilled in the art. The SHG element is disposed between the length of multimode fiber 106 and the output section 308 of the MFRL.

In this embodiment of the present invention, the output section 308 has high reflectance at the emitting wavelength $\lambda_n$ and substantially no reflectance at the second harmonic wavelength $\lambda_n/2$ and the output coupler 310 is also optimized for output coupling at the second harmonic wavelength.

In one embodiment of the present invention the SHG element contains a potassium titanyl phosphate (KTiOPO$_4$ or KTP) crystal. In another embodiment of the present invention the SHG element contains a lithium triborate (LiB$_3$O$_5$ or LBO) crystal. In another embodiment of the present invention the SHG element contains a periodically poled magnesium-oxide doped lithium niobate (MgO:PPLN) crystal poled at a period suitable to quasi-phase match the conversion from $\lambda_n$ to $\lambda_n/2$. SHG is a polarization-dependent process. In another embodiment of the present invention substantially all elements of the MFRL are polarization maintaining, the polarization selected for efficient SHG.

Figure 9:
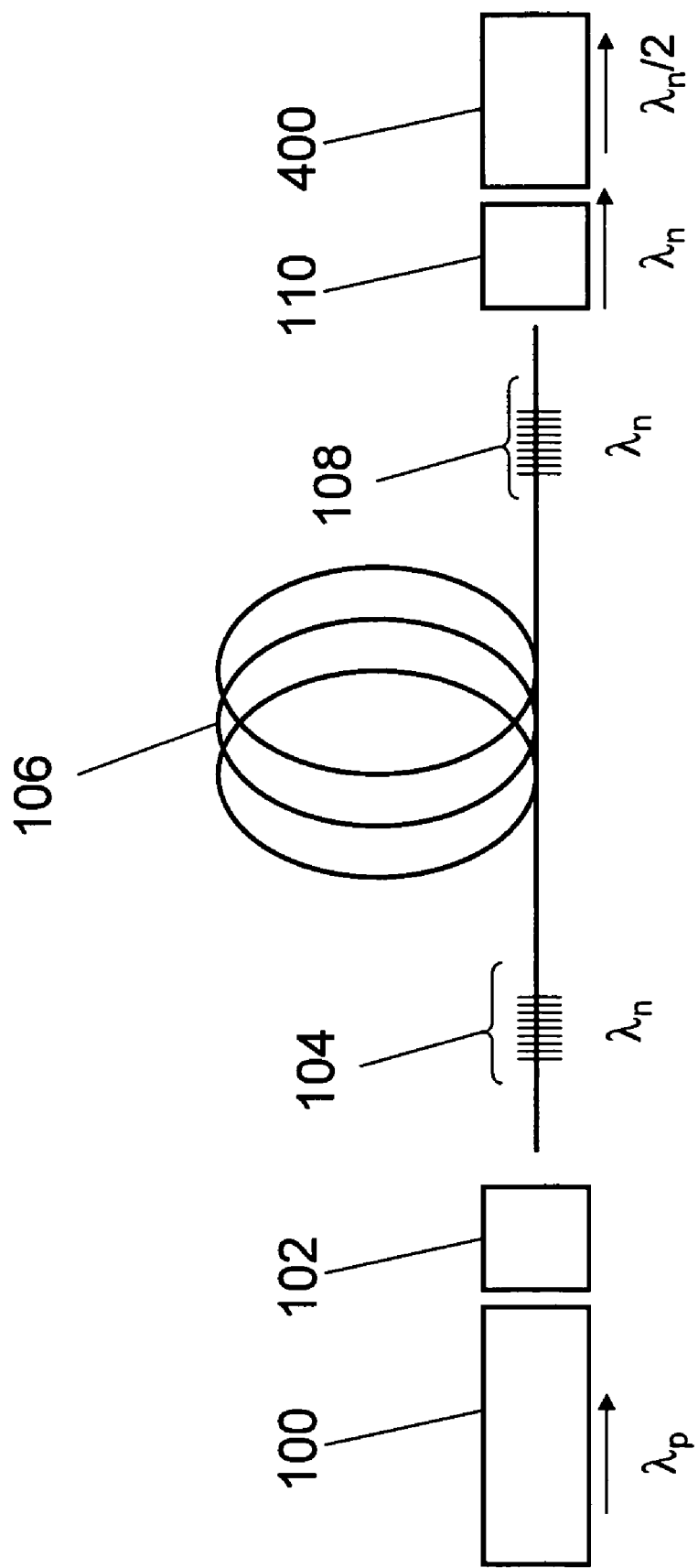
FIG. 9 is a simplified schematic diagram of a multimode-fiber Raman laser source further including a second harmonic generator optically aligned to the laser output according to an embodiment of the present invention.

FIG. 9 is a simplified schematic diagram of a MFRL source further including an external second harmonic generation (SHG) element 400 according to an embodiment of the present invention. As illustrated in FIG. 9, the laser architecture described herein can provide powers beyond the watt level at visible and near visible wavelengths. The single-spatial mode nature of the light generated in the MFRL makes it well suited to efficient SHG by methods know to one skilled in the art. The SHG element is disposed to receive light at wavelength $\lambda_n$ emitted from the output coupler 110 and frequency convert the light to the second harmonic wavelength $\lambda_n/2$. In one embodiment of the present invention the SHG element contains a KTP crystal. In another embodiment of the present invention the SHG element contains an LBO crystal. In another embodiment of the present invention the SHG element contains a MgO:PPLN crystal poled at a period suitable to quasi-phase match the conversion from $\lambda_n$ to $\lambda_n/2$. Single- and multi-pass SHG are polarization-dependent processes. In another embodiment of the present invention substantially all elements of the MFRL are polarization maintaining, the polarization selected for efficient SHG.

Figure 10:
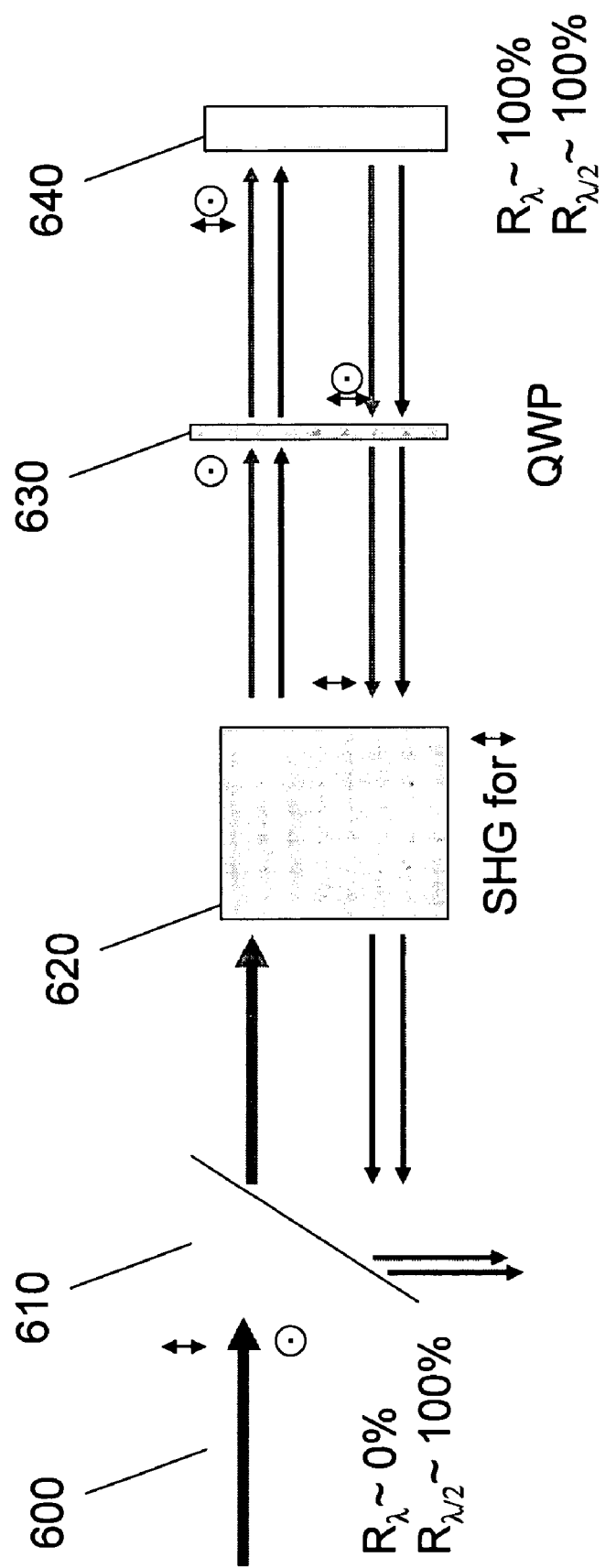
FIG. 10 is a simplified schematic diagram of a method for enhancing SHG efficiency from randomly polarized sources according to an embodiment of the present invention.

FIG. 10 is a simplified schematic diagram of a method for enhancing SHG efficiency from randomly polarized sources. Randomly polarized fundamental wavelength light 600 passes through a dichroic mirror 610 then an SHG crystal 620, in which some percentage of the component of light polarized vertically is converted to the second harmonic. The component of the fundamental light that is polarized horizontally is not converted to the second harmonic. After transmitting the SHG crystal, both wavelengths pass through a quarter-wave plate 630 which rotates the polarization of the fundamental wavelength 45 degrees. The rotated light then reflects off a mirror 640 and is re-transmitted through the quarter-wave plate, in which the fundamental wavelength is rotated an additional 45 degrees. The component of the fundamental wavelength light that entered the system horizontally polarized is now vertically polarized and can thus be efficiently frequency-converted by the SHG crystal. The vertically-polarized light transmits the SHG crystal and is frequency-converted to the second harmonic. The frequency-converted light now reflects off the dichroic mirror and is directed out of the system. The non-frequency-converted light passes through the dichroic mirror.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A multimode-fiber Raman laser comprising:
   a pump source configured to provide optical radiation centered at a pump wavelength $\lambda_p$ and characterized by a spectral bandwidth greater than 100 MHz, thereby inducing negligible stimulated Brillouin scattering; and
   an oscillator resonant at an emission wavelength $\lambda_n$ greater than the pump wavelength, the oscillator including:
      an input coupler optically aligned with the pump source; and
      a multimode optical fiber optically coupled to the input coupler, the multimode optical fiber comprising:
         an input section having a fiber Bragg grating characterized by a first predetermined reflectance at the emission wavelength;
         an intracavity section of a predetermined length optically coupled to the input section, the intracavity section being subjected to a Stimulated Raman Scattering (SRS) process thereby enabling power generation at arbitrary wavelengths; and
         an output section having a fiber Bragg grating characterized by a second predetermined reflectance at the emission wavelength and optically coupled to the intracavity section; and
      an output coupler optically coupled to the multimode optical fiber and configured to provide a laser output at the emission wavelength.

2. The laser of claim 1 wherein the laser output is characterized by a beam quality factor less than 2.

3. The laser of claim 1 wherein the pump source is characterized by multiple spatial modes.

4. The laser of claim 1 wherein the pump source is characterized by a spectral bandwidth greater than 1 GHz.

5. The laser of claim 1 wherein the pump source is characterized by substantially constant power.

6. The laser of claim 1 wherein the pump source is pulsed.

7. The laser of claim 1 wherein the pump source comprises a semiconductor diode laser.

8. The laser of claim 7 wherein the pump source comprises an array of semiconductor diode lasers.

9. The laser of claim 1 wherein the multimode fiber has a core diameter greater than 50 μm and less than 500 μm.

10. The laser of claim 1 wherein the output section further comprises a fiber Bragg grating characterized by a predetermined reflectance at the pump wavelength $\lambda_p$.

11. The laser of claim 1 wherein the output section further comprises a fiber Bragg grating characterized by a reflectance greater than 80% over substantially all wavelengths within the bandwidth of the pump source, for substantially every guided mode in the multimode fiber.

12. The laser of claim 1 wherein the input section comprises a fiber Bragg grating characterized by a reflectance equal to or greater than 98% at wavelength $\lambda_n$ in the fundamental mode of the multimode fiber, in a spectral band less than or substantially equal to 0.3 nm, the output section comprises a fiber Bragg grating characterized by a reflectance at wavelength $\lambda_n$ in the fundamental mode of the multimode fiber, in a spectral band less than or substantially equal to 0.3 nm, the reflectance of the grating predetermined to optimize output power.

13. The laser of claim 1 wherein the output section comprises a partial mirror, the partial mirror characterized by transmittance greater than 1% at the emission wavelength $\lambda_n$, a first surface of the partial mirror being disposed to reflect light back into the multimode fiber, a second surface of the mirror having an optical surface including the output coupler of the laser.

14. The laser of claim 1 wherein:
   the pump source radiation is substantially linearly polarized and delivered via polarization maintaining optical fiber; and
   the multimode fiber is substantially polarization maintaining.

15. The laser of claim 1 wherein the input section further comprises one or more additional fiber Bragg gratings characterized by reflectance at wavelengths $\lambda_{,1}, \lambda_{,2} \ldots \lambda_{n-1} < \lambda_n$ respectively, and the output section further comprises one or more additional fiber Bragg gratings characterized by reflectance at wavelengths $\lambda_{,1}, \lambda_{,2} \ldots \lambda_{n-1} < \lambda_n$ respectively.

16. The laser of claim 15 wherein:
   the input section comprises fiber Bragg gratings characterized by reflectance greater than 98% at $\lambda_{,1}, \lambda_{,2} \ldots \lambda_n$;
   the output section comprises fiber Bragg gratings characterized by reflectance greater than 98% at $\lambda_{,1}, \lambda_{,2} \ldots \lambda_{n-1}$; and
   the output section further comprises a fiber Bragg grating characterized by a reflectance at the emission wavelength $\lambda_n$ less than 98%.

17. The laser of claim 1 wherein substantially all fiber components are substantially polarization maintaining.

18. The laser of claim 1 further including a second-harmonic generator disposed between the input section and the output section, the output section fiber Bragg grating characterized by greater than 98% reflectance at the emission wavelength, $\lambda_n$, the output section grating being further characterized by greater than 90% transmittance at the second harmonic wavelength $\lambda_n/2$.

19. The laser of claim 1 further including a second-harmonic generator disposed between the input section and the output section; the output section fiber Bragg grating characterized by a first reflectance at the emission wavelength, $\lambda_n$ and a second reflectance at the second harmonic wavelength $\lambda_n/2$, the first reflectance being greater than the second reflectance.

20. The laser of claim 1 further including a second-harmonic generation element optically aligned with the laser output configured to produce visible or near-visible radiation at a second harmonic wavelength equal to half the laser emission wavelength.

21. A laser comprising:
   an array of semiconductor diode lasers configured to provide pump radiation at a pump wavelength, wherein the pump radiation is characterized by a spectral bandwidth greater than 1 GHz;
   a multimode optical fiber coupled to the array of semiconductor diode lasers, wherein a core diameter of the multimode optical fiber is between 50 μm and 200 μm;
   an oscillator comprising:
      an input section including a first fiber Bragg grating having a first reflectance at an emission wavelength;
      an intracavity section coupled to the input section; and
      an output section coupled to the intracavity section and including:
         a second fiber Bragg grating having a second reflectance at the laser emission wavelength; and
         a third fiber Bragg grating having a third reflectance at the pump wavelength; and
   a second-harmonic generation element optically aligned to the output section and configured to produce a converted output characterized by a wavelength equal to half the emission wavelength.

22. The laser of claim 21 wherein the second-harmonic generation element is configured to enable the laser output to experience multiple passes through the nonlinear medium to generate the second harmonic.

23. The laser of claim 21 wherein the array of semiconductor lasers are configured to provide CW pump power.

24. The laser of claim 21 wherein the array of semiconductor lasers are configured to provide pulsed pump power.

25. The laser of claim 21 wherein substantially all fiber components are substantially polarization maintaining.

* * * * *